UNITED STATES PATENT OFFICE.

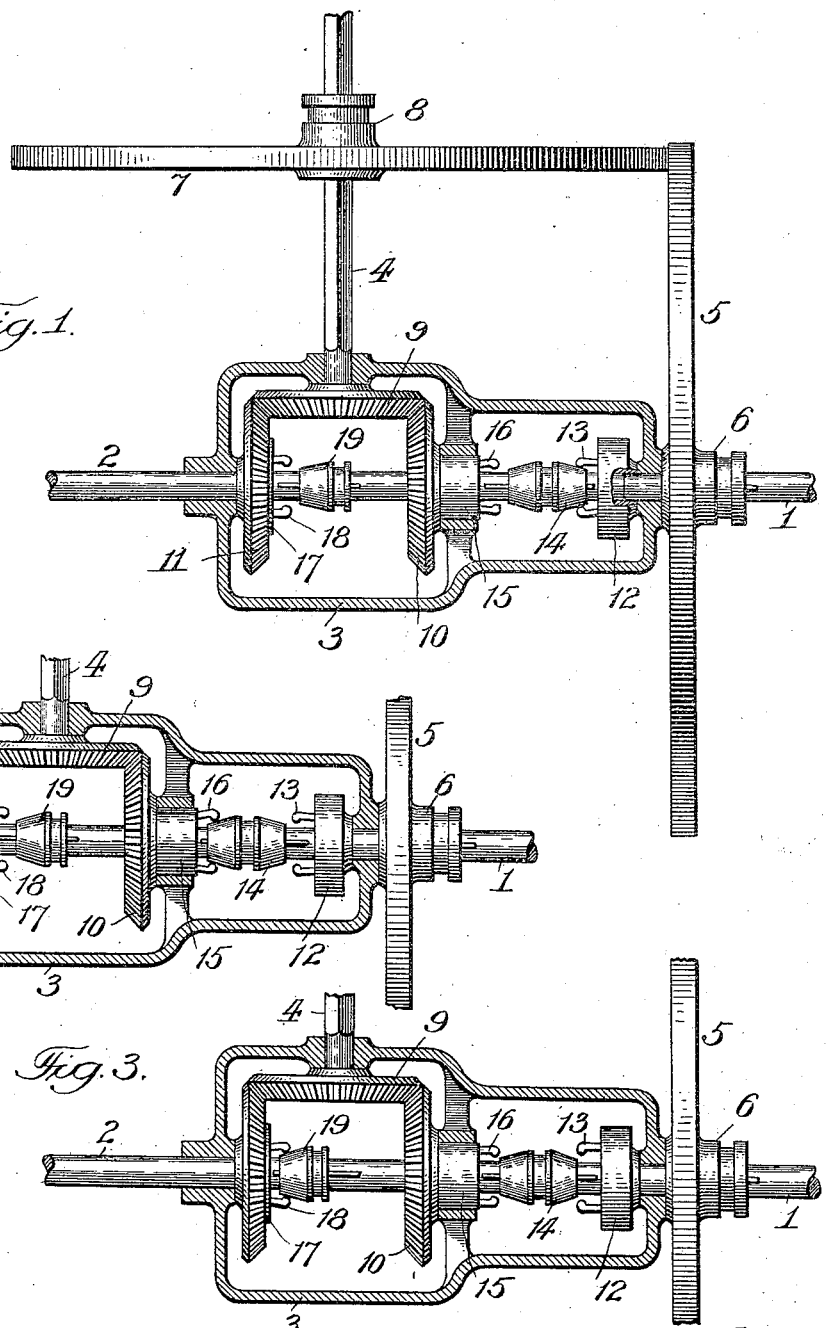

LOUIS BLEITZ AND ROLLEN BLEITZ, OF SANDWICH, ILLINOIS.

SPEED VARYING AND REVERSING MECHANISM.

No. 855,613.  Specification of Letters Patent.  Patented June 4, 1907.

Application filed March 18, 1907. Serial No. 363,144.

To all whom it may concern:

Be it known that we, LOUIS BLEITZ and ROLLEN BLEITZ, citizens of the United States of America, and residents of Sandwich, in the county of Dekalb and State of Illinois, have invented certain new and useful Improvements in Speed Varying and Reversing Mechanisms, of which the following is a specification.

This invention relates to that type of speed varying and reversing mechanisms in which a pair of friction disks in right angle relation are interposed between the driving and driven shaft; and the present improvement has for its object to provide a simple and efficient structural formation and combination of parts, in which the high speed of the driven shaft may be attained in a direct manner, and with which a reverse rotation of the driven shaft is afforded, all as will hereinafter more fully appear.

In the accompanying drawings:—Figure 1, is a sectional elevation of the present speed varying mechanism, showing the driving and driven shaft directly coupled. Fig. 2, is a detail sectional elevation of the same showing the mechanism coupled for an intermediate speed. Fig. 3, is a similar view showing the mechanism coupled for a reverse drive.

Similar numerals of reference indicate like parts in the different views.

Referring to the drawings, 1 is the driving shaft, and 2 the driven shaft of the mechanism, arranged in longitudinal alinement one with the other and having suitable journal bearings in the closed housing 3 of the mechanism; such longitudinal alinement being maintained by the hub portion of one of the clutches hereinafter described.

4, is a countershaft arranged at right angles to the driving and driven shafts aforesaid, and having bearing near one end in the housing 3 aforesaid.

5, is the driving friction disk carried by the driving shaft 1, and having a limited adjustment along the same by means of a suitably arranged lever engaging with a circumferentially grooved hub of said friction disk 5; the purpose being to regulate or wholly remove the frictional engagement between said driving disk and the hereinafter described driven disk.

7, is the driven friction disk having an extended longitudinal adjustment upon a non-circular portion of the countershaft 4, through a suitably arranged lever engaging with the circumferentially grooved hub 8 of said driven disk, the purpose being to shift said disk toward or away from the axis of the driving disk 5 to attain variable speeds of the counter shaft 4 aforesaid.

9, is a bevel gear secured to the end of the countershaft 4, within the housing 3; and 10 and 11 are primary and secondary bevel gears arranged in said housing; such bevel gears 10 and 11 run loosely on the driven shaft 2 and mesh with the bevel gear 9 to receive rotation therefrom in opposite directions.

12, is a clutch member of any usual construction carried by the driving shaft 1 with its hub adapted to form a bearing for the adjacent end of the driven shaft 2, to maintain the two shafts in longitudinal alinement.

13, is a companion clutch member carried by the driven shaft 2, and 14 is a longitudinally sliding coned sleeve for forcing the clutch members 12 and 13 into engagement to cause the driven shaft to rotate in unison with the driving shaft.

15, is a clutch member of any usual construction carried by the primary bevel gear 10; and 16 is a companion clutch member carried by the driven shaft 2. The said clutch members are arranged in adjacent relation to the above described clutch members 12 and 13, and with the sliding coned sleeve 14 located between the two pair of clutch members and adapted to alternately operate said clutches in accordance with the direction in which said sleeve is manually moved. When in a position to force the clutch members 12 and 13 into engagement, the driven shaft 2, will be engaged in a direct manner to the driving shaft 1 to rotate in unison therewith and rotate at high speed; when in a position to force the clutch members 15 and 16 into engagement, the driven shaft 2 is caused to rotate in unison with the primary bevel gear 10, and in the same direction as the main ordinary shaft 1, but at the different rate of speed to which the friction disks aforesaid are set.

17, is a clutch member of any usual construction carried by the secondary bevel gear 11; 18 is a companion clutch member carried by the driven shaft 2, and 19 is a longitudinally sliding coned sleeve for forcing said clutch members into engagement to cause the driven shaft to rotate in unison with the secondary bevel gear and in a reverse direction to that of the driving shaft 1.

Having thus fully described my said invention what I claim as new and desire to secure by Letters Patent, is:—

1. In a speed varying and reversing mechanism, the combination of a driving shaft, a friction driving member carried by said shaft, an adjustable friction driven member, a countershaft carrying the same, a driven shaft in longitudinal alinement with the driving shaft, a clutch between the adjacent ends of the driving and driven shafts, a bevel gear carried by the countershaft, primary and secondary bevel gears mounted loosely on the driven shaft and provided with clutch members, a clutch operating means adapted to alternately engage the clutch between the driving and driven shafts and between the primary bevel gear and the driven shaft, and a clutch operating means adapted to engage the clutch between the secondary bevel gear and the driven shaft, substantially as set forth.

2. In a speed varying and reversing mechanism, the combination of a driving shaft, a driving friction disk carried by the same, a driven friction disk adjustable to and from the axis of the driving disk, a countershaft carrying said driven disk and having a right angle relation to the driving shaft, a driven shaft in longitudinal alinement with the driving shaft, a clutch between the adjacent ends of the driving and driven shafts, a bevel gear carried by the countershaft, primary and secondary bevel gears mounted loosely on the driven shaft and provided with clutch members, a clutch operating means adapted to alternately engage the clutch between the driving and driven shafts and between the primary bevel gear and the driven shaft, and a clutch operating means adapted to engage the clutch between the secondary bevel gear and the driven shaft, substantially as set forth.

Signed at Sandwich, Ills., this 28 day of February 1907.

LOUIS BLEITZ.
ROLLEN BLEITZ.

Witnesses:
J. E. WHITE,
ROBERT BURNS.